(No Model.) 2 Sheets—Sheet 2.

C. H. WEYGANT.
VEHICLE FOR DELIVERING COAL OIL, &c.

No. 361,474. Patented Apr. 19, 1887.

WITNESSES:
Chas. Nida.
C. Sedgwick.

INVENTOR:
C. H. Weygant
BY Munn & Co.
ATTORNEYS.

N. PETERS, Photo-Lithographer, Washington, D. C.

UNITED STATES PATENT OFFICE.

CHARLES H. WEYGANT, OF NEWBURG, NEW YORK.

VEHICLE FOR DELIVERING COAL-OIL, &c.

SPECIFICATION forming part of Letters Patent No. 361,474, dated April 19, 1887.

Application filed August 10, 1886. Serial No. 210,518. (No model.)

*To all whom it may concern:*

Be it known that I, CHARLES H. WEYGANT, of Newburg, in the county of Orange and State of New York, have invented a new and Improved Vehicle for Delivering Coal-Oil and other Liquids in Quantities, of which the following is a full, clear, and exact description.

The object of my invention is to provide practical means whereby coal-oil and other liquids may be measured and transferred from wagons or delivery-trucks to the stationary receptacles of retail dealers without the necessity of using hand measuring-buckets or of unloading the casks or barrels; and to this end my invention consists, principally, in the combination, with a vehicle, (in which a large quantity of liquid may be carried in a tank, barrels, or otherwise,) of a pump, measuring-tank, and hose and reel, by which the liquid may be measured and transferred from the delivery-vehicle to a receptacle some distance away and situated either below, above, or on a level with said vehicle.

The invention also consists of the construction, arrangement, and combination of parts, all as hereinafter described and claimed.

Reference is to be had to the accompanying drawings, forming a part of this specification, in which similar letters of reference indicate corresponding parts in all the figures.

Figure 1:
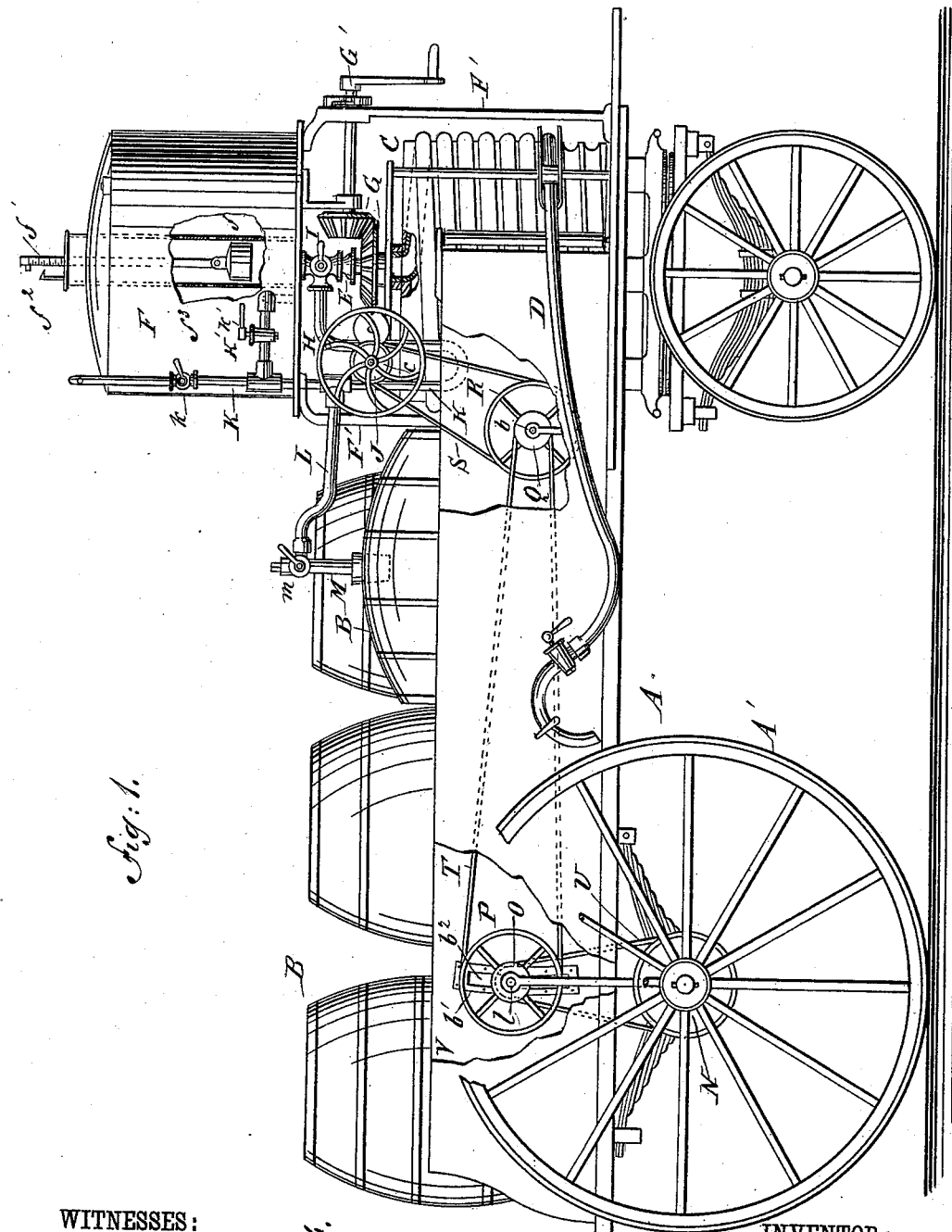
Figure 2:
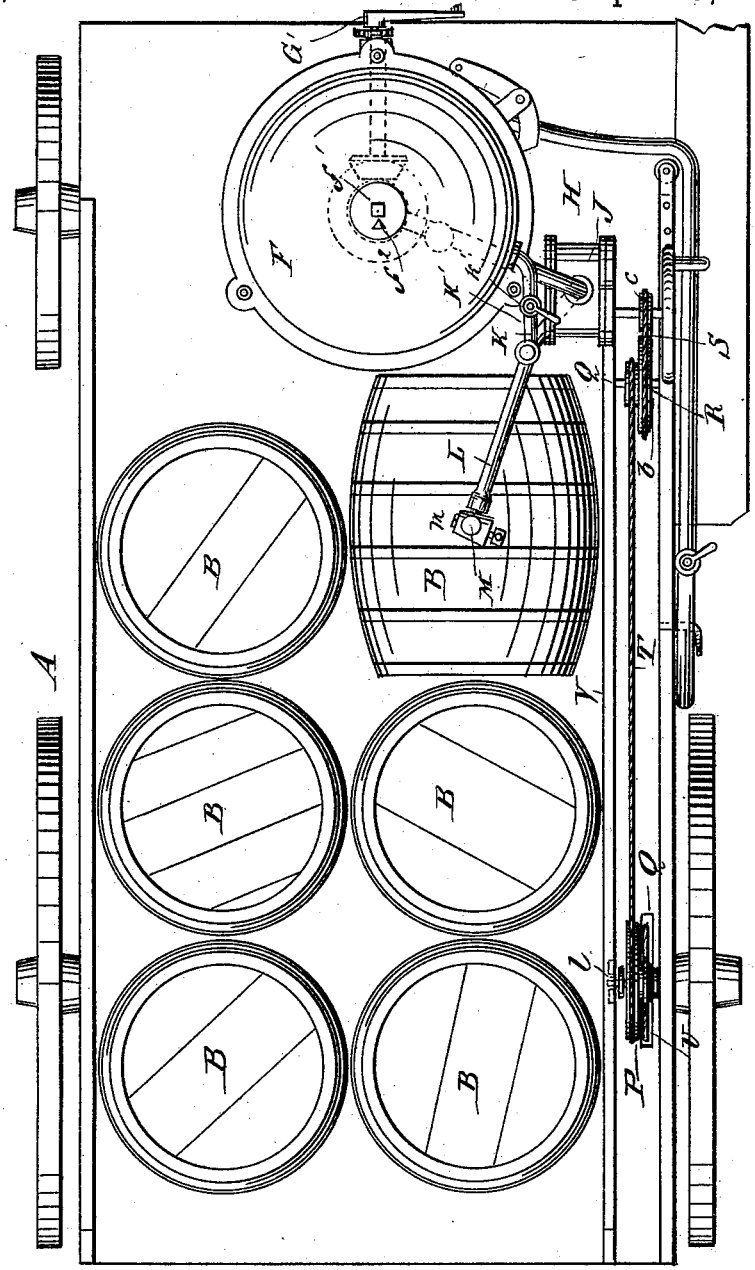
Figure 3:
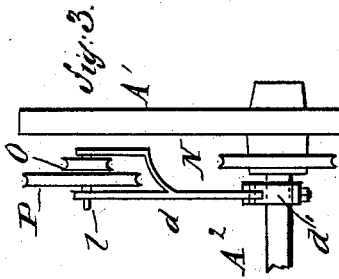

Figure 1 is a broken side elevation of the vehicle and apparatus complete. Fig. 2 is a plan view of the same. Fig. 3 is a detailed view showing the pulley for operating the pump from one of the wheels of the vehicle, and Fig. 4 is a detailed view showing the pulley attachment to the axle.

The vehicle or truck A may be of any suitable construction to receive a tank or the casks B. At the front of the vehicle is located a hose-reel, C, of the construction shown in my patent dated June 29, 1886. Upon the reel is placed the hose D, the end of which is connected to the hollow trunnion E at the top of the hose-reel. This trunnion is connected at its upper end with the elevated tank F, supported upon the upright posts F' F'. The reel is adapted to be turned by the beveled cog-wheels G G and crank-shaft G' for winding up or letting out the hose, and connected to the trunnion E is the branch pipe H, and at the union is fitted a three-way cock, I, which may be turned to close the tank F or to connect pipe H with the tank and close the trunnion, or to cut off the tank and connect pipe H with the trunnion and the hose D. The opposite end of the pipe H connects with the pump J, so that by means of the cock I the pump may be connected either with the hose D or with the tank F, as desired.

The pump J is connected with the casks B by a pipe, K, and branch pipe L, which latter connects with a tube, M, which enters the cask and is provided with a cock, *m*. The pipe K is open at its upper end and provided with a cock, $k$, and is connected with the tank F by a branch pipe, K', also provided with a cock, $k'$, so that by closing cock $k$ and turning the three-way cock I, to close the hollow trunnion and connect pipe H with the hollow trunnion and operating the pumps J, liquid may be forced from the cask into the tank F. By closing cock $k'$ and opening cock I, the liquid may be pumped directly into the hose D, and the tank F being full, by closing cock $k'$ and opening cock I the liquid will flow by gravity from the tank F into and through the hose D. The pipe K is made open at its upper end, so that when desired by opening the cock $k$ and operating the pump the latter will force a current of air through the hose for clearing it of liquid.

The pump J in this instance is a rotary pump and may be operated by hand, and may also be operated from one of the wheels A' of the truck through suitable connecting belts and pulleys, so that as the truck is drawn from place to place a supply of liquid may be transferred from the cask to the elevated tank F, ready to be passed through the hose to a receptacle in the cellar or other part of the retail dealer's establishment.

The means which I have shown in this instance for operating the pump from the wheel A' consists of a pulley, N, secured upon the hub of the wheel, two elevated pulleys, O P, on a short shaft, $l$, two pulleys, Q R, on a short shaft, $b$, a pulley, $c$, on the shaft of the pump, and the three belts, S T U. The shaft $l$ is supported by a forked upright, $d$, hinged to the clip $d'$, attached to the axle $A^2$ of the vehicle, and the inner end of the said shaft $l$ projects into the curved slot $b^2$ of a frame, $b'$, secured to the board V of the vehicle, so that no matter what the movement of the body or axle of the vehicle may be the relative position of the pulleys O P with the pulley N and the pulleys Q R will always be the same, so that there will be no slack in the belts or failure of the pump to operate.

In the tank F is placed a gage-float, $f$, to which is attached a graduated upwardly-projecting bar, $f'$, which reaches up through the top of the tank and acts in connection with the fixed pointer $f^2$ to indicate the quantity of liquid in the tank and the quantity as it is drawn out. The float $f$ works in a perforated tube, $f^3$, fitted in the tank, so that the float and rod $f'$ will always maintain a position parallel with the sides of the tank, whether the vehicle be perfectly upright or not.

In case the pump is not operated by power derived from the wheel A', the liquid need not be pumped by hand into the tank F; but it is preferable to do so in order to measure the liquid; and where the liquid is to be elevated to a higher level than that at which the vehicle stands, the tank F cannot be used, but the liquid will then be pumped directly from the cask to and through the hose to the receptacle.

By turning the crank G' the hose can be easily wound upon the reel or unwound the length required to reach to the receptacle to receive a supply of the liquid.

Having thus fully described my invention, what I claim as new, and desire to secure by Letters Patent, is—

1. A vehicle having mounted upon it a supply-vessel, a measuring-tank, and a hose-reel with requisite amount of hose applied thereto and attached to the measuring-tank, in combination with a pump and pipe connection, connecting the pump with the supply-vessel and the measuring-tank, substantially as described.

2. A vehicle having mounted upon it a supply-vessel, a measuring-tank, and a hose-reel and pump, the latter connected to the supply-vessel and measuring-tank, in combination with a measuring-float placed in the measuring-tank and a hose placed upon the reel and connected to the measuring-tank, substantially as described.

3. A vehicle having mounted upon it a supply-vessel, a measuring-tank, a hose-reel and hose connected to the measuring-tank, and a pump connected to the supply and measuring tank, in combination with a pulley upon a wheel of the vehicle, the elevated pulleys O P, belt U, frame $b'$, having a curved slot, hinged upright support $d$, attached to the axle, the belt T, pulleys Q R, pulley $c$, and belt S, all arranged substantially as and for the purposes set forth.

4. The upright support $d$, hinged to the axle and carrying the pulleys P O, and the frame $b'$, secured to the board V and having the curved slot $b^2$, the shaft of the pulleys O P, entering the curved slot, in combination with the pulley secured to the wheel, the pump, and suitable intermediate pulleys and belts for transmitting motion from the wheel to the pump without interfering with the spring action of the vehicle, substantially as described.

CHARLES H. WEYGANT.

Witnesses:
H. A. WEST,
C. SEDGWICK.